(12) United States Patent
Weiss

(10) Patent No.: US 7,770,490 B1
(45) Date of Patent: Aug. 10, 2010

(54) MOTOR THROTTLE ASSEMBLY

(75) Inventor: Austin Weiss, Parkland, FL (US)

(73) Assignee: Streamline Designs Inc., Stuart, FL (US)

( * ) Notice: Subject to any disclaimer, the term of this patent is extended or adjusted under 35 U.S.C. 154(b) by 900 days.

(21) Appl. No.: 11/639,485

(22) Filed: Dec. 15, 2006

Related U.S. Application Data

(60) Provisional application No. 60/788,402, filed on Mar. 31, 2006.

(51) Int. Cl.
*F16C 1/10* (2006.01)
(52) U.S. Cl. ..................................... 74/502.2
(58) Field of Classification Search ................ 74/473.3, 74/482, 491, 500.5, 501.6, 502.2
See application file for complete search history.

(56) References Cited

U.S. PATENT DOCUMENTS

| | | | | | |
|---|---|---|---|---|---|
| 2,788,676 | A | * | 4/1957 | Spexarth | ....................... 74/489 |
| 4,241,687 | A | * | 12/1980 | DuBois et al. | ................ 440/63 |
| 4,337,053 | A | * | 6/1982 | Stevens | ........................ 440/87 |
| 5,572,907 | A | * | 11/1996 | Kaakinen | ...................... 74/489 |
| 7,204,169 | B2 | * | 4/2007 | Mitchell | ....................... 74/489 |

* cited by examiner

*Primary Examiner*—Vicky A Johnson
(74) *Attorney, Agent, or Firm*—Edward M. Gitten; Edwards Angell Palmer & Dodge, LLP

(57) ABSTRACT

A motor throttle assembly for attachment to a vehicle handle bar. The motor throttle assembly includes a cable pull with a pair of opposed outwardly extending guide posts. The cable pull is disposed within a tubular inner sleeve having a pair of longitudinal cutouts designed for receiving the guide posts therethrough. The inner sleeve is rotatably supported within an outer sleeve having a pair of helical cutouts overlaying the longitudinal cutouts and designed for receiving the guide posts. Manually rotating the outer sleeve produces cooperative action of the helical cutouts and longitudinal cutouts to apply equally balanced force to the guide posts and cause the cable pull to traverse and accelerate the motor. Bearings support the traversing movement of the guide posts and the rotational movement of the outer sleeve for a smooth action of the throttle, with minimal play. The motor throttle assembly is configured to fully open the throttle with an approximately one half turn and the throttle assembly has a spring return.

6 Claims, 2 Drawing Sheets

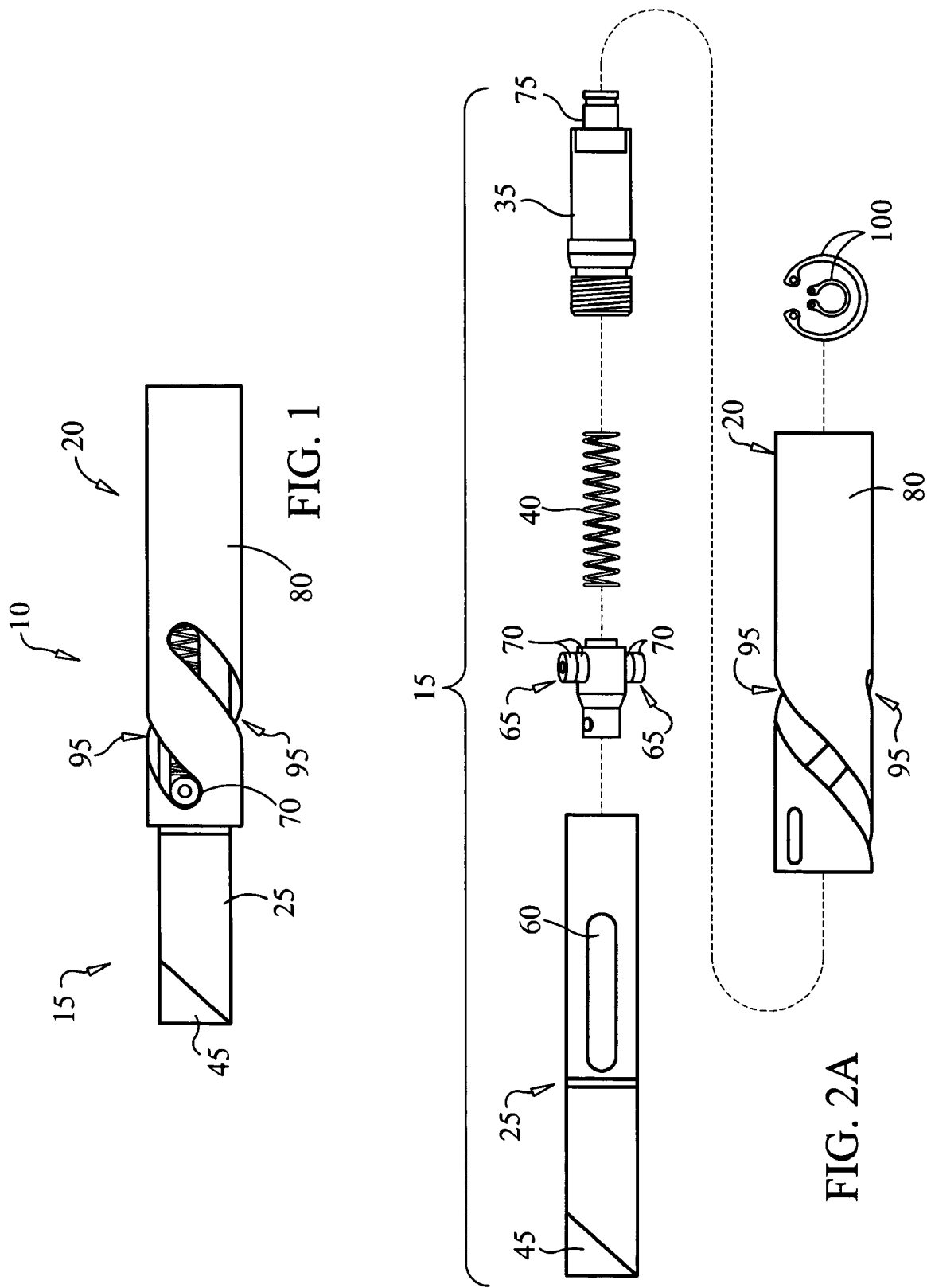

MOTOR THROTTLE ASSEMBLY

CROSS-REFERENCE TO RELATED APPLICATION

This application claims the benefit of co-pending U.S. Provisional Patent Application Ser. No. 60/788,402, filed Mar. 31, 2006, which is incorporated herein in its entirety.

BACKGROUND OF THE INVENTION

1. Field of the Invention

The present invention relates to manually operated motor throttles and particularly to rotating throttle assemblies for mounting on a vehicle handle bar. The rotating throttle assembly of the present invention provides smooth action, reduced rotational range required to fully open the throttle, and a balanced dual post cable pull attached to the throttle cable.

2. Description of the Prior Art

Motor driven vehicles, such as motorcycles, snowmobiles, and jet skis are typically operated by an individual straddling the vehicle and steering with a rotatable handle bar system. Handle bar systems generally comprise two outwardly extending members, one on each side of the vehicle. The members each have a proximal end joined to a stem which extends downward and connects to a steering system. The members each have a distal end covered by a hand grip. The operator grasps one hand grip in each hand and rotates the handle bar, using both hands simultaneously, to turn the vehicle.

It is a conventional design feature to install the motor throttle assembly at the distal end of one of the handle bar members and to configure the throttle to operate by manual rotation of one of the hand grips. The operator may adjust the throttle to control motor speed while maintaining a two handed grip on the handle bar, for steering. Typically, a flexible wire cable is connected to the throttle linkage of the motor, directed by a conventional cable housing to an opening in the handle bar system and led internally to the distal end of one handle bar member, where it may be connected to the throttle assembly.

The throttle assembly comprises an inner sleeve mounted on the handle bar member. Set screws are typically used to retain the inner sleeve on the distal end of the handle bar member. A generally cylindrical cable pull is attached to the cable end and disposed within the inner sleeve. A guide post is mounted on a pin fixed to a side of the cable pull. The guide post is designed to slidably rest within and protrude outward through an elongate longitudinal cutout provided in the inner sleeve. An outer sleeve is provided with an inside diameter slightly larger than the outside diameter of the inner sleeve and the outer sleeve receives the inner sleeve in close fitting and rotatable engagement. The outer sleeve is provided with an elongate longitudinally extending helical cutout designed to receive the protruding portion of the guide post.

A threaded cup is inserted into the outer sleeve and is turned to engage a mating set of threads provided on the inner sleeve. A flange is provided at an intermediate position within the outer sleeve to act as a stop for the threaded cup. Tightening the threaded cup retains the inner sleeve within the outer sleeve. Rotating the outer sleeve urges the guide post along the helical cutout and causes the cable pull to traverse the length of the longitudinal cutout thereby pulling the cable and accelerating the motor.

As the outer sleeve rotates, the relative movement of the helical cutout with respect to the longitudinal cutout applies a resultant force urging the guidepost in a direction parallel to the longitudinal axis of the inner sleeve. The force, which is transmitted through the guide post to the cable pull is unbalanced with regard to the direction of motion, and tends to turn the cable pull sideways during the traverse of the inner sleeve. The frictional force generated at points of contact between the cable pull and the inner sleeve increases with increasing cable tension, producing a non-linear response in the throttle mechanism.

There is a need for a motor throttle assembly designed to apply a balanced force to the cable pull to limit sideways movement, for reducing friction between the cable pull and the inner sleeve and for limiting play in the throttle cable. There is a need for a throttle assembly having means for mounting on a handle bar without requiring set screws. There is a need for a throttle assembly having smooth action, and requiring reduced rotation to fully open the throttle.

SUMMARY OF THE INVENTION

The present invention is directed to a motor throttle assembly, for attachment to a vehicle handle bar. The motor throttle assembly provides smooth action and operates to fully open the motor throttle by rotating a hand grip through a one half turn. The motor throttle assembly comprises a fixed assembly and a rotating assembly. The fixed assembly includes a rigid tubular inner sleeve, and a cable pull. The inner sleeve is provided with means for attachment to a vehicle handle bar. The cable pull is a generally cylindrical plug, having means for attachment of a throttle cable, and is disposed within the inner sleeve. The cable pull includes a pair of opposed outwardly extending guide posts. The guide posts extend through and protrude outward from a pair of aligned elongate longitudinal cutouts provided in diametrically opposite orientation on the inner sleeve.

The rotating assembly comprises a rigid tubular outer sleeve, and bearing means. A pair of elongate longitudinally extending helical cutouts is provided on the outer sleeve, oriented in counterpoise relation. The rotating assembly is designed to receive the fixed assembly with the bearing means interposed in rotatably supporting relation. The longitudinal cutouts underlie the helical cutouts such that the guide posts are confined within the longitudinal cutouts and within the helical cutouts. Each of the guide posts is provided with two guide post bearing sets, one of which rests within a one of the longitudinal cutouts and the other of which rests within a one of the helical cutouts. Retaining means are provided to retain the fixed assembly within the rotating assembly.

The rotation of the outer sleeve draws the guide posts along the helical cutouts and causes the cable pull to traverse the longitudinal cutouts. Each of the helical cutouts applies force to one of the pair of guide posts. The dual point force applied to the guide posts is balanced as to the direction of motion of the cable pull. A one-half turn will fully open the throttle. The bearing means reduce friction in the movement of the rotating assembly and the guide post bearing sets reduce friction in the movement of the guide posts in the cutouts. Spring means may be included to urge the cable pull to return when the hand grip is released, after rotation. A funnel shaped entryway may be provided for convenient insertion of the throttle cable into the inner sleeve.

It is an object of the present invention to provide a motor throttle assembly, mounted on a handle bar, which may be fully opened by a one half turn of the hand grip.

It is another object of the present invention to provide a motor throttle assembly having smooth bearing supported rotational action with a spring return.

It is yet another object of the present invention to provide a motor throttle assembly having balanced dual point force applied to the cable pull.

It is a further object of the present invention to provide a motor throttle assembly having bearing supported traverse for the cable pull.

Finally, it is an object of the present invention to provide a motor throttle assembly having a funnel shaped entryway for leading a throttle cable into the throttle assembly.

BRIEF DESCRIPTION OF THE DRAWINGS

The invention will be further understood, by way of example, with reference to the accompanying drawings, in which:

FIG. 1 is a side perspective view of the motor throttle assembly of the present invention.

FIG. 2a is an exploded view of the motor throttle assembly of the present invention.

DETAILED DESCRIPTION OF THE PREFERRED EMBODIMENTS

Shown throughout the drawings the present invention is generally directed toward a motor throttle assembly, for mounting on a vehicle handle bar, which is capable of smooth bearing supported operation to fully open a motor throttle by a one half turn of the handle bar grip. The motor throttle assembly includes a reduced friction mechanism for balanced pulling of a throttle cable.

Figure 2B:
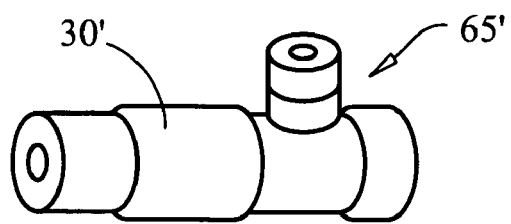
FIG. 2b is a perspective view of a cable pull of the prior art.
Figure 3:
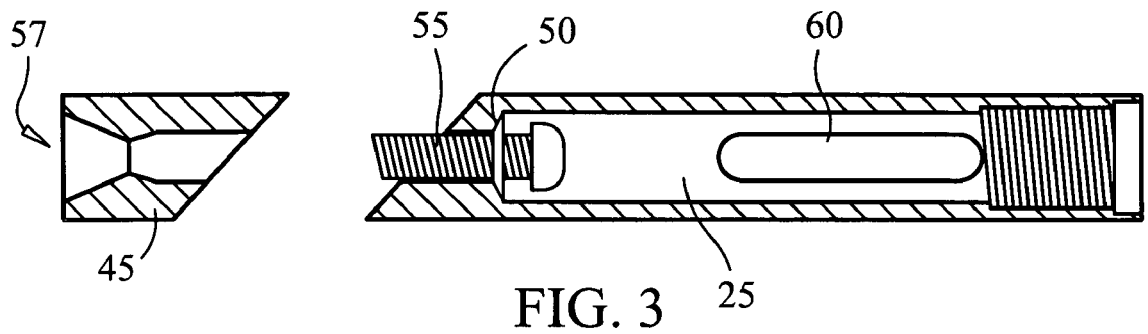
FIG. 3 is a longitudinal cross section view of the inner sleeve of the present invention.

Referring initially to FIG. 1, the motor throttle assembly of the present invention is indicated by reference numeral 10 and comprises a fixed assembly 15 and a rotating assembly 20. As shown in FIG. 2a, the fixed assembly 15 comprises a rigid tubular inner sleeve 25, having a proximal end and a distal end, a cable pull 30, a needle bearing shaft 35, having a first end and a second end, and spring means, preferably a wire coil spring 40, as shown in FIG. 2a. The proximal end of the inner sleeve 25 is provided with means for secure attachment on a vehicle handle bar. Preferably, the inner sleeve 25 is designed to be slidably received inside the vehicle handle bar in close fitting engagement and the proximal end of the inner sleeve 25 is provided with an offset wedge 45, as shown in FIG. 1. The wedge 45 is provided with a threaded through bore and the proximal end of the inner sleeve 25 is provided with a stop 50 and a bolt 55, as shown in FIG. 3. The stop 50 is configured to retain the head of the bolt 55 within the inner sleeve 25 and allow the threaded portion of the bolt 55 to engage the wedge 45. The bolt 55 may be tightened to force the wedge 45 against the inside surface of the handle bar and secure the inner sleeve 25 on the handle bar in the manner of a conventional offset wedge.

A conventional throttle cable is connected to a motor throttle linkage, in a conventional manner and led to the handle bar end according to conventional practice. The wedge 45 is provided with a funnel shaped entryway 57, as shown in FIG. 3, for feeding the cable into the inner sleeve 25. The bolt 55 is provided with a longitudinal through bore (not shown) to allow passage of the cable therethrough. The cable pull 30 is a generally cylindrical plug, sized to fit the inside diameter of the inner sleeve 25 in slidable close fitting engagement. The cable pull 30 is provided with means for attaching the throttle cable. Preferably, a set screw is driven through a threaded transverse hole provided in the cable pull 30. The transverse hole communicates with a hollow formed in an end of the cable pull 30. The throttle cable is provided with an end loop which may be positioned within the hollow and the set screw may be advanced to pass through the loop to span the hollow and attach the throttle cable to the cable pull 30 according to conventional practice. Alternatively, the throttle cable may be fitted with a conventional end anchor designed to be received within the hollow, of the cable pull 30 in close fitting engagement. The set screw may be advanced to engage the anchor and attach the throttle cable to the cable pull 30, also according to conventional practice.

A pair of elongate longitudinal cutouts 60 is provided in diametrically opposite orientation, on the inner sleeve 25. The length of the cutouts is selected to provide full opening of the motor throttle by advancing the cable pull a distance equal to the length of one of the cutouts 60. The cable pull 30 is provided with a pair of outwardly extending guide posts 65 in diametrically opposite positions, as shown in FIG. 2a. The guide posts 65 are designed to extend through and protrude beyond the longitudinal cutouts 60. It is preferred that the guide posts 65 be formed of bearing screws driven into the cable pull 30 and guide post bearing sets preferably mini ball bearing cassettes 70 pressed onto the bearing screws. It is preferred that each of the bearing screws receive two of the mini ball bearing cassettes 70, arranged in a stack, as shown in FIG. 2a. The cable pull 30 is designed to be pulled with equal force on each of the pair of guide posts 65. A prior art cable pull 30' is shown in FIG. 2b, with a single guide post 65'.

The needle bearing shaft 35 is attached to the distal end of the inner sleeve 25 and projects along the longitudinal axis of the inner sleeve 25. The first end of the needle bearing shaft 35 is threaded and designed to mate with threads provided inside the inner sleeve 25, proximate to the distal end. The spring 40 may be disposed between the first end and the cable pull 30 for repelling the advance of the cable pull 30 toward the needle bearing shaft 35. The second end of the needle bearing shaft 25 is provided with an outwardly extending needle bearing post 75, which extends along the longitudinal axis of the inner sleeve 25. The inner sleeve 25, the cable pull 30, and the needle bearing shaft 35 are preferably formed of aluminum, such as 6061 T-6 hard coated; however, other materials, particularly lightweight metals, are suitable. The bearing screws and the coil spring 40 are preferably formed of stainless steel.

Figure 4:
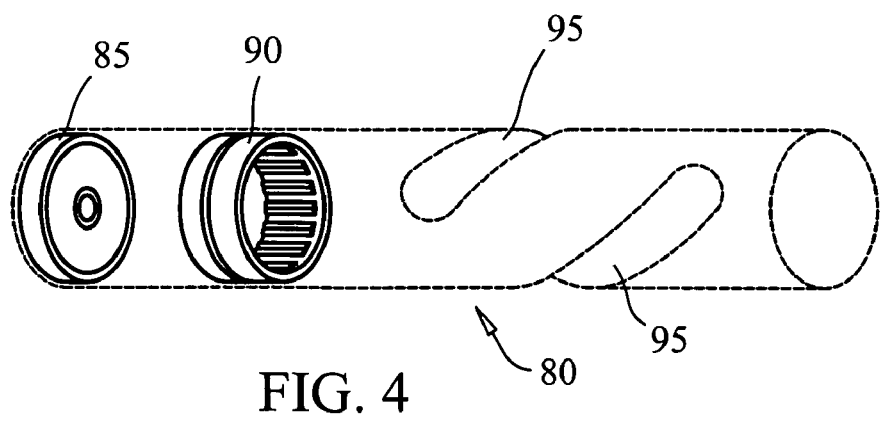
FIG. 4 is a side perspective view of the rotating assembly, with the outer sleeve shown in dotted lines to display the inside.

The rotating assembly 20 comprises a rigid tubular outer sleeve 80, having two ends, namely a proximal end and a distal end, and bearing means. Bearing means are preferably a radial bearing 85, and a needle bearing 90. The radial bearing 85 is disposed inside the outer sleeve 80, proximate to the distal end and the needle bearing 90 is disposed inside the outer sleeve 80 proximate to the radial bearing 85, as shown in FIG. 4. A ⅝ sealed radial bearing is suitable to provide the radial bearing 85, for the present invention. A conventional annular needle bearing sized to fit within the outer sleeve 80 is suitable. The outer sleeve 80 is designed to slidably receive the fixed assembly in close fitting relation with the needle bearing post 75 rotatably supported by the radial bearing 85 and with the needle bearing shaft 35 rotatably supported by the needle bearing 90. A pair of elongate longitudinally extending helical cutouts 95 is provided on the outer sleeve 80, in counterpoise relation. Each of the helical cutouts 95 overlays one of the longitudinal cutouts 60 and is designed to receive one of the pair of guideposts 65. As referenced above, the guideposts 65 include bearing sets. The bearing sets preferably consist of a first pair of bearing sets, each configured to rest within a one of the longitudinal cutouts 60 and a second pair of bearing sets, each configured to rest within a one of the helical cutouts 95. Retaining means, such as ring clips 100, shown in FIG. 2a, are provided to lock the radial bearing 85 in position at the distal end of the outer sleeve 80 and to lock the needle bearing post 75 in position contacting the radial bearing 85. It is preferred that a rubber O-ring (not shown) be disposed between the inner sleeve 25 and the outer sleeve 80, proximate to the proximal end of the outer sleeve 80, to prevent the entry of foreign particles. The outer sleeve 80 is preferably formed of the same material used to form the inner sleeve 25, the needle bearing shaft 35 and the cable pull 30.

In use, a hand grip is mounted in conventional manner to cover the outer sleeve 80. Manual rotation of the outer sleeve 80 is accomplished by turning the hand grip. As the outer sleeve 80 rotates, the cable pull 30 is urged along the inner sleeve 35 by cooperative action of the helical cutouts 95 and the longitudinal cutouts 60. The resultant force from the cooperative action is applied to the guide posts 65 in balanced dual point fashion so that the cable pull 30 progresses in a generally straight path along the inner sleeve 25. Friction from contact between the cable pull 30 and the inner sleeve 25 is minimized. Each of the bearing cassettes 75 provides bearing supported movement at points of contact between boundaries of the cutouts and the guide posts 65. The rotation of the rotating assembly 20 with respect to the fixed assembly 15 is bearing supported by the radial bearing 85 and by the needle bearing 90. The helical cutouts 95 and the longitudinal cutouts 60 are configured to provide a full opening of the motor throttle with a one half turn of the rotating assembly 20. The throttle cable routing is internal thereby preventing foreign objects from interfering with the throttle operation and presenting an attractive appearance. The motor throttle assembly of the present invention provides smooth operation, free of play for a positive feel in the control of motor speed. It will be appreciated by those skilled in the art that the motor throttle assembly of the present invention is suitable for all types of vehicles having handle bar steering systems as well as being easily adaptable for use by handicapped individuals to control the throttle in motor vehicles having steering wheels.

While the preferred embodiments of the invention have been described above, it will be recognized and understood that various modifications can be made in the invention and the appended claims are intended to cover all such modifications which may fall within the spirit and scope of the invention.

What is claimed is:

1. A motor throttle assembly, for attachment on a handle bar, comprising:
   a fixed assembly and a rotating assembly;
   said fixed assembly comprising a rigid tubular inner sleeve and a cable pull;
   said inner sleeve having means for attachment on said handle bar and having a pair of aligned diametrically opposed longitudinal cutouts;
   said cable pull being slidably disposed within said inner sleeve and having means for attaching a throttle cable;
   said cable pull having a pair of opposed outwardly extending guide posts designed to rest within and protrude outward through said longitudinal cutouts;
   said rotating assembly comprising a rigid tubular outer sleeve and bearing means;
   said outer sleeve having a pair of longitudinally extending helical cutouts in counterpoise relation;
   said rotating assembly being designed to receive said fixed assembly therein, with said bearing means interposed in rotatable supporting relation, and said pair of longitudinal cutouts underlying said pair of helical cutouts for receiving said pair of guide posts through said longitudinal cutouts and into said helical cutouts;
   whereby rotation of said rotating assembly draws said guide posts along said helical cutouts, with balanced force, and causes said cable pull to traverse said inner sleeve and accelerate a motor; and
   a first pair of guide post bearing sets mounted on said guide posts, for reducing friction between said guide posts and said longitudinal cutouts and a second pair of guide post bearing sets mounted on said guide posts for reducing friction between said posts and said helical cutouts.

2. A motor throttle assembly, for attachment on a handle bar, comprising:
   a fixed assembly and a rotating assembly;
   said fixed assembly comprising a rigid tubular inner sleeve and a cable pull;
   said inner sleeve having means for attachment on said handle bar and having a pair of aligned diametrically opposed longitudinal cutouts;
   said cable pull being slidably disposed within said inner sleeve and having means for attaching a throttle cable;
   said cable pull having a pair of opposed outwardly extending guide posts designed to rest within and protrude outward through said longitudinal cutouts;
   said rotating assembly comprising a rigid tubular outer sleeve and bearing means;
   said outer sleeve having a pair of longitudinally extending helical cutouts in counterpoise relation;
   said rotating assembly being designed to receive said fixed assembly therein, with said bearing means interposed in rotatable supporting relation, and said pair of longitudinal cutouts underlying said pair of helical cutouts for receiving said pair of guide posts through said longitudinal cutouts and into said helical cutouts;
   whereby rotation of said rotating assembly draws said guide posts along said helical cutouts, with balanced force, and causes said cable pull to traverse said inner sleeve and accelerate a motor, spring means for opposing traverse of said cable pull to urge return of said outer sleeve after rotation and to decelerate a motor.

3. A motor throttle assembly, for attachment on a handle bar, comprising:
   a fixed assembly and a rotating assembly;
   said fixed assembly comprising a rigid tubular inner sleeve and a cable pull;
   said inner sleeve having means for attachment on said handle bar and having a pair of aligned diametrically opposed longitudinal cutouts;
   said cable pull being slidably disposed within said inner sleeve and having means for attaching a throttle cable;
   said cable pull having a pair of opposed outwardly extending guide posts designed to rest within and protrude outward through said longitudinal cutouts;
   said rotating assembly comprising a rigid tubular outer sleeve and bearing means;
   said outer sleeve having a pair of longitudinally extending helical cutouts in counterpoise relation;
   said rotating assembly being designed to receive said fixed assembly therein, with said bearing means interposed in rotatable supporting relation, and said pair of longitudinal cutouts underlying said pair of helical cutouts for receiving said pair of guide posts through said longitudinal cutouts and into said helical cutouts;
   whereby rotation of said rotating assembly draws said guide posts along said helical cutouts, with balanced force, and causes said cable pull to traverse said inner sleeve and accelerate a motor, wherein said inner sleeve includes a proximal end and a distal end;

said bearing means including a radial bearing resting proximate to said distal end and a needle bearing resting proximate to said radial bearing;

said radial bearing and said needle bearing being mounted inside said outer sleeve.

4. The motor throttle assembly of claim 3, wherein each of said pair of helical cutouts is configured such that a measure of longitudinal progression, of said cable pull, equal to the length of one of said longitudinal cutouts is coincident with rotational progression of a one half turn, of said outer sleeve, for providing convenient motor speed control.

5. The motor throttle assembly of claim 3, wherein said means for attachment on said handle bar comprise an offset wedge system, on the proximal end of said inner sleeve, designed for insertion into said handle bar, for mounting.

6. The motor throttle assembly of claim 5, wherein said offset wedge system includes and offset wedge having a funnel shaped entryway communicating with a through bore, for inserting said throttle cable therethrough.

* * * * *

UNITED STATES PATENT AND TRADEMARK OFFICE
CERTIFICATE OF CORRECTION

PATENT NO.        : 7,770,490 B1
APPLICATION NO.   : 11/639485
DATED             : August 10, 2010
INVENTOR(S)       : Austin Weiss It is certified that error appears in the above-identified patent and that said Letters Patent is hereby corrected as shown below:

On the cover page, "(73) Assignee: Streamline Designs, Inc., Stuart, FL (US)" is listed.

Please delete the Assignee information as the Patent has not been assigned.

Signed and Sealed this
Fourth Day of October, 2011

David J. Kappos
*Director of the United States Patent and Trademark Office*